United States Patent [19]

Herold et al.

[11] Patent Number: 4,500,604
[45] Date of Patent: Feb. 19, 1985

[54] BONDINGS AND COMPOSITE FILMS

[75] Inventors: Julius Herold, Monheim; Werner Gruber, Korschenbroich; Guenter Henke, Neuss, all of Fed. Rep. of Germany

[73] Assignee: Henkel Kommanditgesellschaft auf Aktien, Duesseldorf, Fed. Rep. of Germany

[21] Appl. No.: 466,996

[22] Filed: Feb. 16, 1983

[30] Foreign Application Priority Data

Feb. 18, 1982 [DE] Fed. Rep. of Germany ....... 3205733

[51] Int. Cl.³ ..................... B32B 27/38; C08L 63/00; C08L 75/00; C09J 5/00
[52] U.S. Cl. .................................. 428/414; 156/330; 156/331.1; 156/331.4; 428/413; 525/423; 525/424
[58] Field of Search ............... 525/424, 526, 528, 423; 156/330, 331.1, 331.4; 428/413, 414

[56] References Cited

U.S. PATENT DOCUMENTS

| | | | |
|---|---|---|---|
| 2,830,038 | 4/1958 | Pattison | 525/526 |
| 3,424,719 | 1/1969 | Masters | 525/528 |
| 3,510,439 | 5/1970 | Kaltenbach et al. | 525/528 |
| 3,912,566 | 10/1975 | Andrews et al. | 525/528 |
| 4,000,214 | 12/1976 | Lum et al. | 525/528 |
| 4,036,906 | 7/1977 | Finelli | 525/528 |
| 4,070,225 | 1/1978 | Batdorf | 428/414 |
| 4,143,009 | 3/1979 | Dewey | 525/528 |

FOREIGN PATENT DOCUMENTS

| | | | |
|---|---|---|---|
| 52-42596 | 4/1977 | Japan | 525/528 |
| 639901 | 2/1979 | U.S.S.R. | 525/528 |
| 730752 | 5/1980 | U.S.S.R. | 525/528 |

OTHER PUBLICATIONS

Lee et al., "Handbook of Epoxy Resins", McGraw-Hill Book Company, N.Y.C., 3/67, pp. 10-5 & 10-6.
Encyclopedia of Polymer Science and Technology, vol. 9, pp. 184–189.

*Primary Examiner*—Allan M. Lieberman
*Attorney, Agent, or Firm*—Ernest G. Szoke; Henry E. Millson; Mark A. Greenfield

[57] ABSTRACT

Process and compositions for producing bondings based on a two component adhesive system comprising
1. an epoxide group-containing prepolymer obtained by reacting a polyether-urethane or a polyester-urethane which contains at least two terminal isocyanate groups with equivalent quantities of glycidol, and
2. a primary amino group-containing polyether or polyamide having at least two primary amino groups, and a molecular weight between 200 and 1800.

20 Claims, No Drawings

BONDINGS AND COMPOSITE FILMS

BACKGROUND OF THE INVENTION

The present invention relates to novel adhesives based on epoxy group-containing prepolymers and primary amino group-containing compounds, as well as the use of these new adhesives, especially in the production of composite films.

It is known that a great variety of so-called epoxy resins can be crosslinked with amino group-containing polyethers in order to form adhesives. It is also known, especially with reference to the production of composite films, that adhesive systems of isocyanate-containing prepolymers and polyethers with primary or secondary amino groups may be employed, specifically with the simultaneous use of solvents. Such adhesive systems, which are usually not mixed until shortly before use, generally provide usable adhesion values.

A disadvantage of these systems is the fraction of monomeric diisocyanates, for example, diphenylmethane-4,4'-diisocyanate or toluylene diisocyanate, usually present because of the random nature of the polyaddition. Because of the vapor pressure of the isocyanate, which is not negligible, especially at elevated temperatures, a number of tedious and costly occupational safety measures must be employed. Furthermore, the hardening of the systems mentioned may also be negatively influenced by atmospheric humidity and moisture in the materials, as well as residual alcoholic solvent from the printing inks used.

DESCRIPTION OF THE INVENTION

The present invention relates to new reactive adhesives which contain no isocyanates and therefore do not have the disadvantages of systems containing them, but whose adhesion to the film materials desired for specific applications and whose film flexibility corresponds to the previously employed isocyanate systems.

More specifically, the invention relates to a process for producing bondings based on a first component which is an epoxy group-containing prepolymer and a second component which is a primary amino group-containing compound, wherein the epoxy group-containing compound is obtained by reacting a polyether urethane or a polyester urethane, containing at least two terminal isocyanate groups, with equivalent quantities of glycidol, and wherein the primary amino group-containing compound is a polyether and/or a polyamide containing at least two terminal primary amino groups and having a number-average molecular weight between about 200 and about 1800.

Polyethers or polyesters containing at least two isocyanate groups which can be used herein for the preparation of the first component can be produced in a known manner. For example, polyethers containing at least two isocyanate groups can be prepared by reacting polyether diols with isocyanates that are at least bifunctional. Preferred polyether diols are derived from glycols containing 2 to 4 carbon atoms. Thus, polyethylene glycol and/or polypropylene glycol and/or polytetramethylene glycol (produced by ring opening polymerization of tetrahydrofuran) can be employed. Adducts of ethylene oxide and/or propylene oxide to polyhydric alcohols such as glycerine, trimethylolpropane and pentaerythritol can also be used.

Also suitable are polyesters containing at least two —OH groups per molecule, which can be produced from bi-functional or polyfunctional low molecular weight alcohols such as ethylene glycol, propane diol, butane diol, hexane diol, glycerine, trimethylolpropane, and low molecular weight carboxylic acids such as adipic acid, isophthalic acid, terephthalic acid, hexane dicarboxylic acid, and substoichiometric quantities of dimerized fatty acids. Polycaprolactone diols which can be produced in a known manner by ring opening polymerization are also usable as starting materials. Finally, polyether diamines may also be used for this purpose, e.g., polyoxypropylene diamine or polyoxyethylenediamine. The number average molecular weight of these —OH or —NH$_2$ group containing starting materials are between about 1,000 and about 10,000, preferably between about 1500 and about 5000. As used throughout this specification, the molecular weight is a number-average molecular weight as determined by the number of end-groups (generally hydroxyl). This type of determination was made in the analytical laboratory during the introduction of the product and was verified during further operations. A description of the technique used will be found in the "Encyclopedia of Polymer Science and Technology," Volume 9, pages 184–189.

For reacting these starting materials with isocyanates, relatively low molecular weight isocyanates are preferred, e.g., hexamethylene diisocyanate, trimethylhexamethylene diisocyanate, dicyclohexylmethane diisocyanate, isophorone diisocyanate, toluylene diisocyanate (mixture of isomers), or diphenylmethane diisocyanate in admixture with polyfunctional isocyanates. In addition, for the purposes of the invention there can be used reaction products of polyhydric alcohols and diisocyanates (reaction ratio: 1 mol diisocyanate per hydroxyl group) wherein the reaction products contain at least three isocyanate groups, for example the reaction product of trimethylolpropane and toluylene diisocyanate, as well as reaction products consisting of 1 mol of water and 3 mols of diisocyanate, for example, beginning from hexamethylene diisocyanate (N,N',N''-tris(6-isocyanato-hexamethylene)biuret), and also other aromatic triisocyanates such as 4,4',4''-triisocyanatotriphenylmethane, and also polyisocyanates such as polymethylenepolyphenyl isocyanate.

The reaction of the isocyanate groups with glycidol

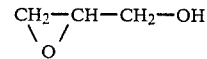

is known and proceeds readily, especially upon addition of catalysts such as ε-caprolactam or organotin compounds, for example dibutyltindilaurate, at temperatures between about −5° and +40° C. In this reaction, depending on the intended use, inert organic solvents such as ketones, hydrocarbons, chlorinated hydrocarbons, as well as ethers and esters may be used. In particular, readily volatile solvents such as acetone, butanone, hexane, methyl chloride, diethyl ether and ethyl acetate are suitable.

The second reaction component used in accordance with the invention is an amine which is at least bifunctional. At least two terminal primary amino groups must be present. Compounds of this type are known or are readily produced by known methods.

A preferred base structure for the amino compounds are polyether diols or oligomeric glycols. In accordance with a preferred embodiment, acrylonitrile is added to a polyether diol. The resulting adducts are then hydrogenated in a known manner, whereupon primary amino groups form from the nitrile groups. Preferred are oligomeric glycols or polyether glycols derived from polyethylene glycol, polypropylene glycol and polytetramethylene glycol.

Favorable results are also achieved with the use of polyamino amides, obtained in a known manner by reacting low molecular weight amines such as ethylenediamine, propylenediamine, dipropylenetriamine, diethylenetriamine, butylenediamine, triethylenetetramine, or mixtures of the above, with dimerized fatty acids.

The above starting materials for the preparation of the amine component are selected so that the molecular weight of the amine component falls within the range given above, i.e., between about 200 and about 1800.

The two components forming the adhesives of the invention should not be mixed until shortly before use. The finished mixture has a pot life of between 1 and 48 hours, depending on the specific components used and the temperature. The two components are mixed together in a ratio, based on 1 equivalent of hardener (second component) of from about 0.9 to about 2.5, preferably from about 1 to 2.2, equivalents of resin (first component). If rigid substrates of low permeability are to be bonded together, solvents need not be employed. On the other hand it may be advantageous for the adhesion or coating of thin, flexible substrates such as films to use volatile solvents as adjuncts.

For example, composites can be produced using the process and products of the invention from plastic films such as polyethylene, polypropylene, polyethylene terephthalate, polyester, polyvinyl chloride, polystyrene, polycarbonate, polyimide, or polyamide film or the like, which may also be lacquered, coated or metal-vapor-deposited. Furthermore, the production of composite films can also be carried out in accordance with the invention using metal foils, for example aluminum foil, copper foil, with or without a tin coating, lead foil, or the various viscoses, or paper, or fleece made of aromatic polyamide or polyester.

The invention will be illustrated by the following examples which are not given for purposes of limitation.

EXAMPLES 1-15

Component 1

Resin A

Fifty g (0.4 eq.) of diphenylmethane-4,4'-diisocyanate, 192.6 g (0.19 eq.) of a polyester diol based on adipic acid, isophthalic acid and hexane diol as well as propylene glycol-1,2—the weight ratio being 62:38:30:20—with a molecular weight of 2000, and 1.33 g (0.01 eq.) of an adduct of 6 mol ethylene oxide and 1 mol trimethylolpropane were dissolved in 250 g methyl ethyl ketone and agitated for 2 hours at 65° C. under nitrogen.

Free isocyanate group content: 1.7%

After cooling, 14.8 g (0.2 eq.) of glycidol and 0.25 g of dibutyltin dilaurate were added and agitation was continued for 4 hours at 22° C.

Brookfield viscosity of the solution at 22° C., 120 mPa.sec.

Free isocyanate groups: 0.00%
Epoxy groups: 0.59%

Resin B

This resin was produced in the same manner as Resin A, but with 0.20 equivalents of the same polyester diol, and without the trimethylol propane adduct.

Resin C

This resin was produced in the same manner as Resin B, but under addition of 1%, based on solid material, of N,N',N''-tris(6-isocyanatohexamethylene)biuret and correspondingly more glycidol to maintain a 1:1 equivalent ratio.

Component 2

The hardeners consist of the following polyamines:

| Hardener | Polyamine |
|---|---|
| I | polyoxypropylenediamine(molecular weight 230) |
| II | polyoxypropylenediamine(molecular weight 400) |
| III | polyoxypropylenetriamine(molecular weight 400) |
| IV | mixture of 9 parts by weight hardener II and 1 part by weight hardener III |
| V | polyaminoamide based on dimerized fatty acids and polyalkyleneamines (amine number 90) |

To achieve bondings the solutions of resin and hardener were mixed in an epoxide/amine equivalent ratio of 1:1 (except for EXAMPLE 11 where the ratio was 2:1). In EXAMPLE 1, the solution was spread onto a 19μ thick polyethyleneterephthalate film and dried for 5 min at 22° C., whereupon a 3μ thick adhesive film remained. A 50μ thick, corona-pretreated polyethylene film was placed on top of this and pressed firmly in place with a rubber roller.

In addition, the composite films of EXAMPLES 2-15 were prepared in a similar manner, using the resin, hardener, equivalent ratio and film composite given in Table 1 below. The composite adhesion and weld seam adhesion of the composites of EXAMPLES 1-15 were tested and the results set forth in Table 1.

The following abbreviations are used in Table 1:

| PETP | polyethylene tepephthalate film, d = 19 |
|---|---|
| PE | polyethylene (corona treated) film, d = 50 |
| Alu | aluminum foil, d = 50 |
| PA | polyamide-6-film, d = 50 |
| V | aromatic polyamide fleece |
| VH | represents the composite adhesion. |

The measurement quantity used (N/15 mm) was the 180° peel resistance in newtons upon separation of the two films, measured on a 15 mm wide strip, with a pull-off speed of 100 mm/min at 22° C.

SNH represents the weld seam adhesion. The measurement variable used (N/15 mm) was the 180° peel resistance in newtons upon separation of a weld seam of the film composite, produced at 140° C./2 sec, measured on a 15 mm wide strip, with a pull-away speed of 100 mm/min at 22° C.

The adhesion values were determined after 14 days of storage at 22° C.

TABLE 1

| Example | Resin | Hardener | Equivalent Ratio | Composite | VH | SNH |
|---|---|---|---|---|---|---|
| 1 | B | II | 1/1 | PETP/PE | 4.0 | 32 |
| 2 | B | V | 1/1 | PETP/PE | 4.0 | 38 |

TABLE 1-continued

| Example | Resin | Hardener | Equivalent Ratio | Composite | VH | SNH |
|---|---|---|---|---|---|---|
| 2 | C | II | 1/1 | Alu/PE | 4.5 | 40 |
| 3 | C | II | 1/1 | PA/PE | 4.8 | 34 |
| 5 | C | II | 1/1 | PETP/PE | 3.5 | 29 |
| 6 | B | II | 1/1 | PETP/PE | 4.2 | 38 |
| 7 | B | IV | 1/1 | PETP/PE | 4.2 | 35 |
| 8 | A | IV | 1/1 | PETP/PE | 3.7 | 31 |
| 9 | B | II | 1/1 | PA/PE | 3.5 | 28 |
| 10 | B | I | 1/1 | PA/PE | 4.5 | 32 |
| 11 | B | I | 2/1 | PA/PE | 5.0 | 34 |
| 12 | B | I | 1/1 | Alu/PE | 8.5 | 45 |
| 13 | B | II | 1/1 | Alu/PE | 5.0 | 41 |
| 14 | B | I | 1/1 | PETP/V | 15.0 | — |
| 15 | B | I | 1/1 | PETP/Copper | 12.0 | — |

What is claimed is:

1. A two component adhesive system wherein the components are maintained separately prior to mixing the components together to achieve bonding consisting essentially of:
    (a) about 0.9 to about 2.5 equivalents of a first component which is a prepolymer containing an epoxy group wherein the prepolymer is the reaction product of (i) a polyether urethane or a polyester urethane, said urethane having at least two terminal isocyanate groups, and (ii) an equivalent quantity of glycidol; and
    (b) 1.0 equivalent of a second component which is at least one member of the group consisting of a polyether containing at least two terminal primary amino groups and a polyamide containing at least two terminal primary amino groups, and wherein said polyether and polyamide have a number-average molecular weight in the range of from about 200 to about 1800.

2. An adhesive system in accordance with claim 1 wherein in said first component the polyether urethane or polyester urethane having at least two terminal isocyanate groups is obtained from a compound which is either a polyether diol, a polyester having at least two —OH groups thereon, or a polyether diamine, wherein said compound has a number-average molecular weight in the range of from about 1000 to about 10,000.

3. An adhesive system in accordance with claim 2 wherein said compound has a number-average molecular weight in the range of about 1500 to about 5000.

4. A process for bonding at least one material together comprising applying thereto a two component adhesive system which consists essentially of:
    (a) about 0.9 to about 2.5 equivalents of a first component which is a prepolymer containing an epoxy group wherein the prepolymer is the reaction product of (i) a polyether urethane or a polyester urethane, said urethane having at least two terminal isocyanate groups, and (ii) an equivalent quantity of glycidol; and
    (b) 1.0 equivalent of a second component which is at least one member of the group consisting of a polyether containing at least two terminal primary amino groups and a polyamide containing at least two terminal primary amino groups, and wherein said polyether and polyamide have a number-average molecular weight in the range of from about 200 to about 1800.

5. A process in accordance with claim 4 wherein in said first component in the two component adhesive system the polyether urethane or polyester urethane having at least two terminal isocyanate groups is obtained from a compound which is either a polyether diol, a polyester having at least two —OH groups thereon, or a polyether diamine, wherein said compound has a number-average molecular weight in the range of about 1000 to about 10,000.

6. A process in accordance with claim 5 wherein said compound has a number-average molecular weight in the range of about 1500 to about 5000.

7. A process in accordance with claim 4 wherein in said two component adhesive system from about 1 to about 2.2 equivalents of the first component are present for each 1 equivalent of the second component.

8. A process in accordance with claim 4 wherein the process is used to prepare a composite film.

9. A process in accordance with claim 8 wherein the composite film contains at least one film selected from the group consisting of a plastic film, a metal foil, a viscose, paper, a fleece composed of an aromatic polyamide, and a fleece composed of an aromatic polyester.

10. A process in accordance with claim 9 wherein the film is polyethylene.

11. A process in accordance with claim 9 wherein the film is polypropylene.

12. A process in accordance with claim 9 wherein the film is polyethylene terephthalate.

13. A composite film bonded together with a two component adhesive system consisting essentially of:
    (a) about 0.9 to about 2.5 equivalents of a first component which is a prepolymer containing an epoxy group wherein the prepolymer is the reaction product of (i) a polyether urethane or a polyester urethane, said urethane having at least two terminal isocyanate groups, and (ii) an equivalent quantity of glycidol; and
    (b) 1.0 equivalent of a second component which is at least one member of the group consisting of a polyether containing at least two terminal primary amino groups and a polyamide containing at least two terminal primary amino groups, and wherein said polyether and polyamide have a number-average molecular weight in the range of from about 200 to about 1800.

14. A composite film in accordance with claim 13 wherein in said first component in the two component adhesive system the polyether urethane or polyester urethane having at least two terminal isocyanate groups is obtained from a compound which is either a polyether diol, a polyester having at least two —OH groups thereon, or a polyether diamine, wherein said compound has a number-average molecular weight in the range of about 1000 to about 10,000.

15. A composite film in accordance with claim 14 wherein said compound has a number-average molecular weight in the range of about 1500 to about 5000.

16. A composite film in accordance with claim 13 wherein in said two component adhesive system from about 1 to about 2.2 equivalents of the first component are present for each 1 equivalent of the second component.

17. A composite film in accordance with claim 13 wherein the composite film contains at least two films selected from the group consisting of a plastic film, a metal foil, a viscose, paper, a fleece composed of an aromatic polyamide, and a fleece composed of an aromatic polyester.

18. A composite film in accordance with claim 17 wherein one of said films is polyethylene.

19. A composite film in accordance with claim 17 wherein one of said films is polypropylene.

20. A composite film in accordance with claim 17 wherein one of said films is polyethylene terephthalate.

* * * * *